United States Patent
Wang et al.

(10) Patent No.: US 12,504,889 B2
(45) Date of Patent: Dec. 23, 2025

(54) MEMORY MANAGEMENT METHOD FOR EVENLY DISTRIBUTING INPUT OUTPUT LATENCY TIME, MEMORY STORAGE DEVICE, AND MEMORY CONTROL CIRCUIT UNIT

(71) Applicant: Hefei Core Storage Electronic Limited, Anhui (CN)

(72) Inventors: Chih-Ling Wang, Anhui (CN); Ya Jie Guo, Henan (CN); En Yang Wang, Anhui (CN); Kuai Cao, Anhui (CN); Dong Dong Yao, Anhui (CN); Yun Peng Zhang, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 52 days.

(21) Appl. No.: 18/760,043

(22) Filed: Jul. 1, 2024

(65) Prior Publication Data
US 2025/0244883 A1  Jul. 31, 2025

(30) Foreign Application Priority Data

Jan. 25, 2024  (CN) .......................... 202410102317.X (51) Int. Cl.
*G06F 3/00* (2006.01)
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0659; G06F 3/0679
See application file for complete search history.

(56) References Cited

U.S. PATENT DOCUMENTS 9,792,070 B2 * 10/2017 Nakaso ................ G06F 3/0652
2013/0145085 A1  6/2013 Yu et al.
(Continued)

FOREIGN PATENT DOCUMENTS

CN       106681932       5/2017
CN       107402716      11/2017
(Continued)

OTHER PUBLICATIONS

"Office Action of Taiwan Counterpart Application", issued on Nov. 15, 2024, p. 1-p. 4.

*Primary Examiner* — Midys Rojas
(74) *Attorney, Agent, or Firm* — JCIPRNET (57) ABSTRACT

A memory management method, a memory storage device, and a memory control circuit unit are provided. The memory management method includes: creating a physical block management table for managing physical blocks; selecting at least one physical block to be refreshed based on the physical block management table when power is restored after an abnormal power loss; in response to a number of the at least one physical block to be refreshed being greater than 1, determining at least one current state and at least one category of the at least one physical block to be refreshed; and executing at least one second write operation based on the current state and the category together when executing a first write operation. The first write operation includes writing user data into a cache. The second write operation includes writing data stored in a physical block to be refreshed into a first physical block.

9 Claims, 6 Drawing Sheets

(56) References Cited

U.S. PATENT DOCUMENTS

| | | | |
|---|---|---|---|
| 2015/0347310 A1 | 12/2015 | Ish et al. | |
| 2017/0228171 A1 | 8/2017 | Huang | |
| 2017/0262228 A1* | 9/2017 | Kanno | G11C 16/10 |
| 2017/0269873 A1 | 9/2017 | Tan | |
| 2017/0329706 A1 | 11/2017 | Nemawarkar et al. | |
| 2020/0097400 A1* | 3/2020 | Lee | G06F 12/0253 |
| 2020/0201752 A1 | 6/2020 | Palmer | |
| 2023/0038857 A1* | 2/2023 | Tomlin | G06F 3/061 |
| 2023/0409235 A1 | 12/2023 | Das et al. | |
| 2024/0103737 A1* | 3/2024 | Punzo | G06F 3/0619 |
| 2024/0302957 A1* | 9/2024 | Yang | G06F 3/061 |

FOREIGN PATENT DOCUMENTS

| | | |
|---|---|---|
| CN | 107590080 | 1/2018 |
| CN | 112463656 | 3/2021 |
| CN | 112988069 | 6/2021 |
| CN | 113296701 | 8/2021 |
| CN | 116431524 | 7/2023 |
| TW | I437431 | 5/2014 |
| TW | I498902 | 9/2015 |
| TW | I795119 | 3/2023 |

\* cited by examiner

MEMORY MANAGEMENT METHOD FOR EVENLY DISTRIBUTING INPUT OUTPUT LATENCY TIME, MEMORY STORAGE DEVICE, AND MEMORY CONTROL CIRCUIT UNIT

CROSS-REFERENCE TO RELATED APPLICATION

This application claims the priority benefit of China application serial no. 202410102317.X, filed on Jan. 25, 2024. The entirety of the above-mentioned patent application is hereby incorporated by reference herein and made a part of this specification.

BACKGROUND

Technical Field

The disclosure relates to a memory refresh technology, and in particular to a memory management method, a memory storage device, and a memory control circuit unit.

Description of Related Art

Smartphones, tablet computers, and notebook computers have grown rapidly in recent years, resulting in a rapid increase in consumer demand for storage media. Since the rewritable non-volatile memory module (for example, a flash memory) has characteristics such as non-volatile data, power saving, small size, and no mechanical structure, the rewritable non-volatile memory module is very suitable to be built into various portable multimedia devices exemplified above.

In order to cope with issues such as an abnormal/sudden power loss, a cross temperature, or a read disturb that often occur in a memory storage device, during a power-on initialization process, the memory storage device needs to perform a refresh operation on some physical blocks. However, as the capacity of the memory storage device increases, input output (IO) latency time caused by the refresh operation also increases, which seriously affects the quality of experience of a user.

SUMMARY

The disclosure provides a memory management method, a memory storage device, and a memory control circuit unit, which can evenly distribute input output (IO) latency time to improve the quality of experience of a user.

An exemplary embodiment of the disclosure provides a memory management method for a memory storage device. The memory storage device includes a rewritable non-volatile memory module and cache. The rewritable non-volatile memory module stores multiple physical blocks. The memory management method includes the following steps. A physical block management table for managing the physical blocks is created. At least one physical block to be refreshed is selected based on the physical block management table when power is restored after an abnormal power loss. In response to a number of the at least one physical block to be refreshed being greater than 1, at least one current state and at least one category of the at least one physical block to be refreshed are determined. At least one second write operation is executed based on the at least one current state and the at least one category together when executing a first write operation. The first write operation includes writing user data into the cache, and each of the at least one second write operation includes writing data stored in a physical block to be refreshed into a first physical block.

In an exemplary embodiment of the disclosure, the memory management method further includes, in response to the number of the at least one physical block to be refreshed being equal to 1, executing the second write operation together when executing the first write operation.

In an exemplary embodiment of the disclosure, each of the at least one current state is one of an urgent state and a normal state.

In an exemplary embodiment of the invention, the step of executing the at least one second write operation based on the at least one current state and the at least one category includes, in response to current states of the at least one physical block to be refreshed being different, prioritizing execution of a second write operation of a physical block to be refreshed having the urgent state.

In an exemplary embodiment of the disclosure, the step of executing the at least one second write operation based on the at least one current state and the at least one category includes, in response to current states of the at least one physical block to be refreshed being the same, sequentially executing second write operations corresponding to the mapping physical block, the garbage collection physical block, and the data physical block.

An exemplary embodiment of the disclosure also provides a memory storage device, which includes a connection interface unit, a rewritable non-volatile memory module, and a memory control circuit unit. The connection interface unit is used to couple to a host system. The memory control circuit unit is coupled to the connection interface unit and the rewritable non-volatile memory module. The memory control circuit unit includes a cache. The rewritable non-volatile memory module stores multiple physical blocks. The memory control circuit unit is used to create a physical block management table for managing the physical blocks. The memory control circuit unit is further used to select at least one physical block to be refreshed based on the physical block management table when power is restored after an abnormal power loss. In response to a number of the at least one physical block to be refreshed being greater than 1, the memory control circuit unit is further used to determine at least one current state and at least one category of the at least one physical block to be refreshed. At least one second write operation is executed based on the at least one current state and the at least one category together when executing a first write operation. The first write operation includes writing user data into the cache. Each of the at least one second write operation includes writing data stored in a physical block to be refreshed into a first physical block.

In an exemplary embodiment of the disclosure, in response to the number of the at least one physical block to be refreshed being equal to 1, the memory control circuit unit is further used to execute the second write operation together when executing the first write operation.

In an exemplary embodiment of the disclosure, in response to current states of the at least one physical block to be refreshed being different, the memory control circuit unit is further used to prioritize execution of a second write operation of a physical block to be refreshed having the urgent state.

In an exemplary embodiment of the disclosure, in response to current states of the at least one physical block to be refreshed being the same, the memory control circuit unit is further used to sequentially execute second write operations corresponding to the mapping physical block, the garbage collection physical block, and the data physical block.

An exemplary embodiment of the disclosure also provides a memory control circuit unit, which is used to control a rewritable non-volatile memory module. The memory control circuit unit includes a host interface, a memory interface, a cache, and a memory management circuit. The host interface is used to couple to a host system. The memory interface is used to couple to the rewritable non-volatile memory module. The cache is used to couple the host interface and the memory interface. The memory management circuit is coupled to the host interface, the memory interface, and the cache. The rewritable non-volatile memory module stores multiple physical blocks. The memory management circuit is used to create a physical block management table for managing the physical blocks. The memory management circuit is further used to select at least one physical block to be refreshed based on the physical block management table when power is restored after an abnormal power loss. In response to a number of the at least one physical block to be refreshed being greater than 1, the memory management circuit is further used to determine at least one current state and at least one category of the at least one physical block to be refreshed. The memory management circuit is further used to execute at least one second write operation based on the at least one current state and the at least one category together when executing a first write operation. The first write operation includes writing user data into the cache. Each of the at least one second write operation includes writing data stored in a physical block to be refreshed into a first physical block.

In an exemplary embodiment of the disclosure, in response to the number of the at least one physical block to be refreshed being equal to 1, the memory management circuit is further used to execute the second write operation together when executing the first write operation.

In an exemplary embodiment of the disclosure, in response to current states of the at least one physical block to be refreshed being different, the memory management circuit is further used to prioritize execution of a second write operation of a physical block to be refreshed having the urgent state.

In an exemplary embodiment of the disclosure, in response to current states of the at least one physical block to be refreshed being the same, the memory management circuit is further used to sequentially execute second write operations corresponding to the mapping physical block, the garbage collection physical block, and the data physical block.

Based on the above, in the memory management method, the memory storage device, and the memory control circuit unit of the disclosure, the second write operation may be executed together when executing the first write operation. In other words, in the memory management method, the memory storage device, and the memory control circuit unit of the disclosure, the refresh operation (the second write operation) of the physical block to be refreshed may be completed in stages before the cache is fully written, so that the input output (IO) latency can be evenly distributed to improve the quality of experience of the user.

In order for the features and advantages of the disclosure to be more comprehensible, the following specific embodiments are described in detail in conjunction with the drawings.

DESCRIPTION OF THE EMBODIMENTS

Generally speaking, a memory storage device (also referred to as a memory storage system) includes a rewritable non-volatile memory module and a controller (also referred to as a control circuit). The memory storage device may be used together with a host system, so that the host system may write data into the memory storage device or read data from the memory storage device.

Figure 1:
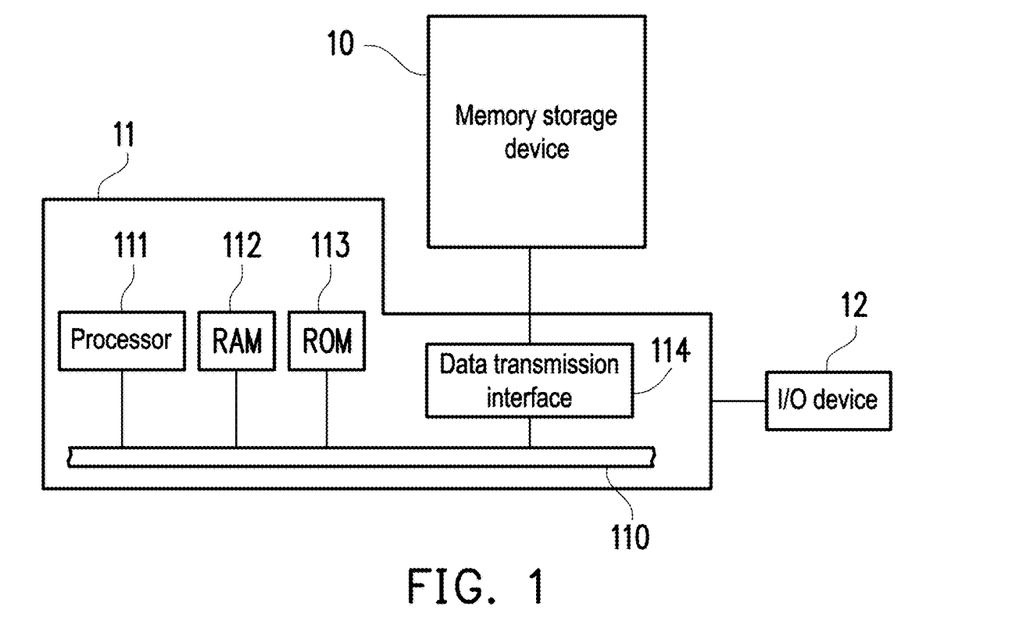
FIG. 1 is a schematic diagram of a host system, a memory storage device, and an input/output (I/O) device according to an exemplary embodiment of the disclosure.
Figure 2:
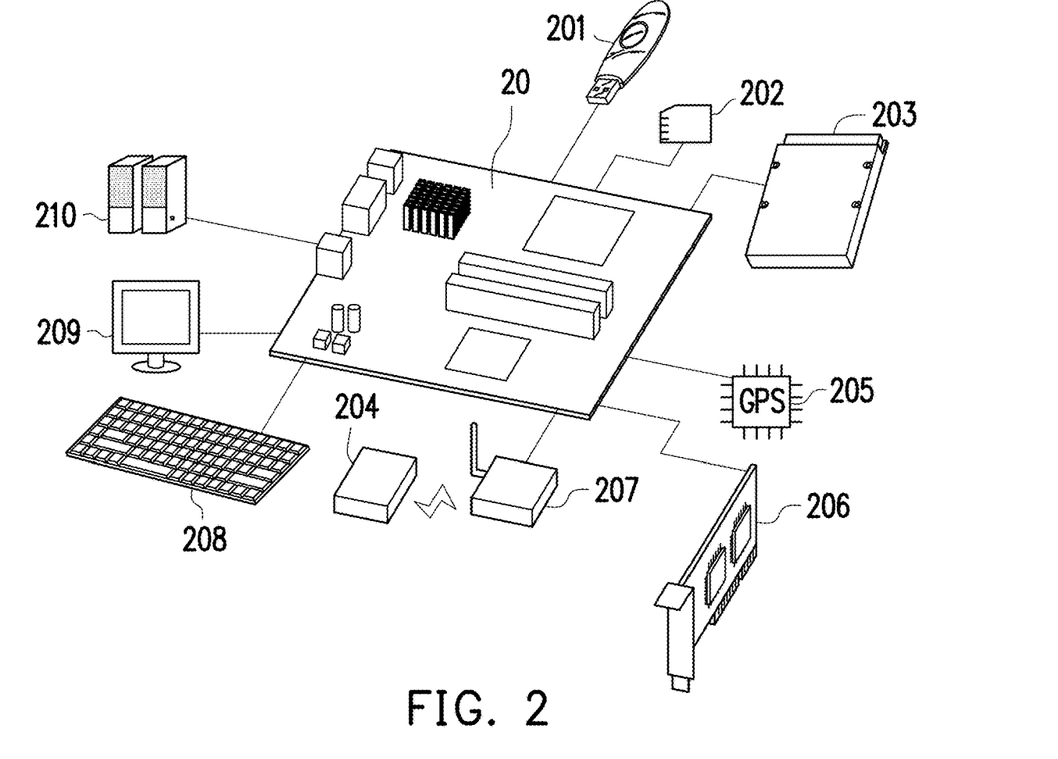
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Please refer to FIG. 1 and FIG. 2. A host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to the memory storage device 10 through the data transmission interface 114. For example, the host system 11 may store data to the memory storage device 10 or read data from the memory storage device 10 via the data transmission interface 114. In addition, the host system 11 may be coupled to the I/O device 12 through the system bus 110. For example, the host system 11 may send an output signal to the I/O device 12 or receive an input signal from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. Through the data transmission interface 114, the motherboard 20 may be coupled to the memory storage device 10 via a wired or wireless manner.

In an exemplary embodiment, the memory storage device 10 may, for example, be a flash drive 201, a memory card 202, a solid state drive (SSD) 203, or a wireless memory storage device 204. The wireless memory storage device 204 may, for example, be a near field communication (NFC) memory storage device, a WiFi memory storage device, a Bluetooth memory storage device, a low-power Bluetooth memory storage device (for example, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, and various other I/O devices through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be substantially any system that may cooperate with a memory storage device to store data. In an exemplary embodiment, the memory storage device 10 and the host system 11 may respectively include a storage device 30 and a system 31 of FIG. 3.

Figure 3:
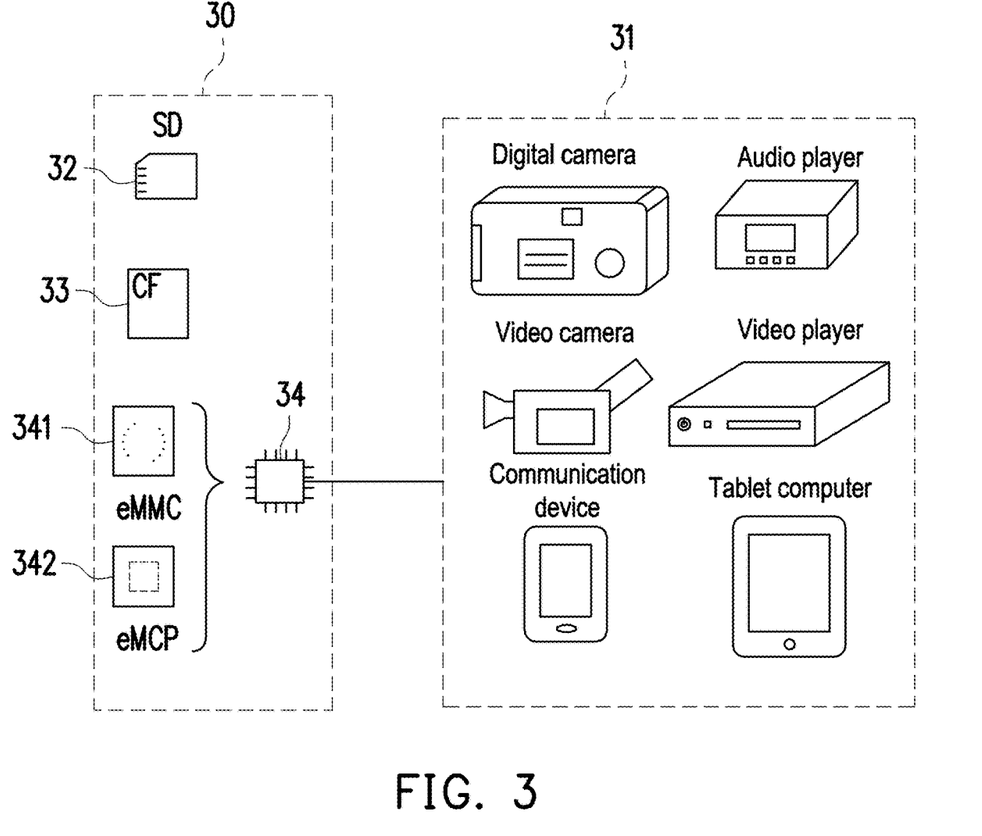
FIG. 3 is a schematic diagram of a system and a storage device according to an exemplary embodiment of the disclosure.

FIG. 3 is a schematic diagram of a system and a storage device according to an exemplary embodiment of the disclosure.

Please refer to FIG. 3. The storage device 30 may be used in conjunction with the system 31 to store data. For example, the system 31 may be a system such as a digital camera, a video camera, a communication device, an audio player, a video player, or a tablet computer. For example, the storage device 30 may be a secure digital (SD) card 32, a compact flash (CF) card 33, an embedded storage device 34, or various other non-volatile memory storage devices used by the system 31. The embedded storage device 34 includes an embedded multi media card (eMMC) 341, an embedded multi chip package (eMCP) storage device 342, and/or various other embedded storage devices in which a memory module is directly coupled onto a substrate of a host system.

Figure 4:
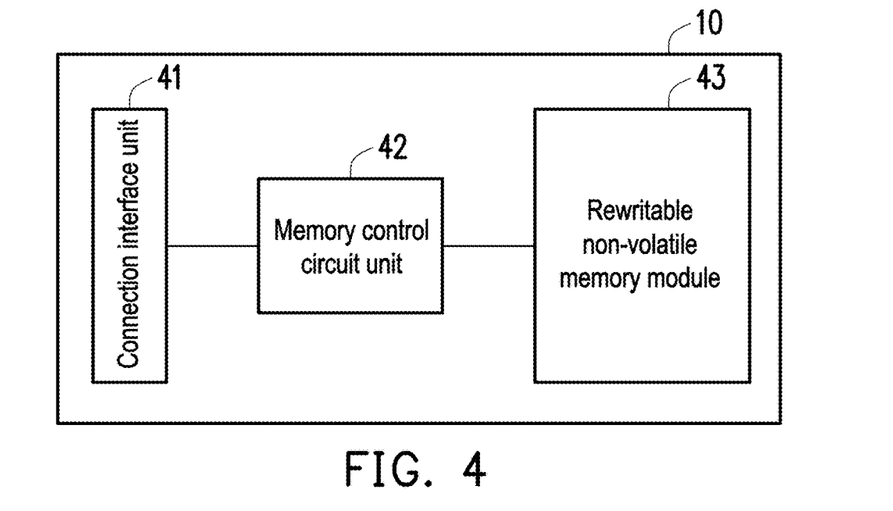
FIG. 4 is a schematic diagram of a memory storage device according to an exemplary embodiment of the disclosure.

FIG. 4 is a schematic diagram of a memory storage device according to an exemplary embodiment of the disclosure.

Please refer to FIG. 4. The memory storage device 10 includes a connection interface unit 41, a memory control circuit unit 42, and a rewritable non-volatile memory module 43.

The connection interface unit 41 is used to couple the memory storage device 10 to the host system 11. The memory storage device 10 may communicate with the host system 11 via the connection interface unit 41. In an exemplary embodiment, the connection interface unit 41 is compatible with the peripheral component interconnect express (PCI express) standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 may be packaged in one chip with the memory control circuit unit 42 or the connection interface unit 41 may be arranged outside a chip containing the memory control circuit unit 42.

The memory control circuit unit 42 is coupled to the connection interface unit 41 and the rewritable non-volatile memory module 43. The memory control circuit unit 42 is used to execute multiple logic gates or control commands implemented in the form of hardware or the form of firmware and perform operations such as data writing, reading, and erasing in the rewritable non-volatile memory module 43 according to a command of the host system 11.

The rewritable non-volatile memory module 43 is used to store data written by the host system 11. The rewritable non-volatile memory module 43 may include a single level cell (SLC) NAND flash memory module (that is, a flash memory module that may store 1 bit in one memory cell), a multi level cell (MLC) NAND flash memory module (that is, a flash memory module that may store 2 bits in one memory cell), a triple level cell (TLC) NAND flash memory module (that is, a flash memory module that may store 3 bits in one memory cell), a quad level cell (QLC) NAND flash memory module (that is, a flash memory module that may store 4 bits in one memory cell), other flash memory modules, or other memory modules having the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons of the charge trapping layer may be changed, thereby changing the threshold voltage of the memory cell. The operation of changing the threshold voltage of the memory cell is also referred to as "writing data into the memory cell" or "programming the memory cell". As the threshold voltage changes, each memory cell in the rewritable non-volatile memory module 43 has multiple storage states. Through applying a read voltage, it is possible to determine which storage state a memory cell belongs to, so as to obtain one or more bits stored in the memory cell.

In an exemplary embodiment, memory cells of the rewritable non-volatile memory module 43 may constitute multiple physical programming units, and the physical programming units may constitute multiple physical erasing units. Specifically, the memory cells on the same word line may form one or more physical programming units. If each memory cell may store more than 2 bits, the physical programming units on the same word line may be classified into at least one lower physical programming unit and an upper physical programming unit. For example, a least significant bit (LSB) of a memory cell belongs to the lower physical programming unit, and a most significant bit (MSB) of a memory cell belongs to the upper physical programming unit. Generally speaking, in the MLC NAND flash memory, the write speed of the lower physical programming unit is greater than the write speed of the upper physical programming unit and/or the reliability of the lower physical programming unit is higher than the reliability of the upper physical programming unit.

In an exemplary embodiment, the physical programming unit is the smallest unit of programming. That is, the physical programming unit is the smallest unit of writing data. For example, the physical programming unit may be a physical page or a physical sector. If the physical programming unit is a physical page, the physical programming units may include a data bit area and a redundancy bit area. The data bit area contains multiple physical sectors for storing user data, and the redundancy bit area is used to store system data (for example, management data such as an error correcting code). In an exemplary embodiment, the data bit area contains 32 physical sectors, and the size of one physical sector is 512 bytes (B). However, in other exemplary embodiments, the data bit area may also contain 8, 16, more, or less physical sectors, and the size of each physical sector may also be greater or smaller. On the other hand, the physical erasing unit is the smallest unit of erasure. That is, each physical erasing unit contains the smallest number of memory cells to be erased together. For example, the physical erasing unit is a physical block.

Figure 5:
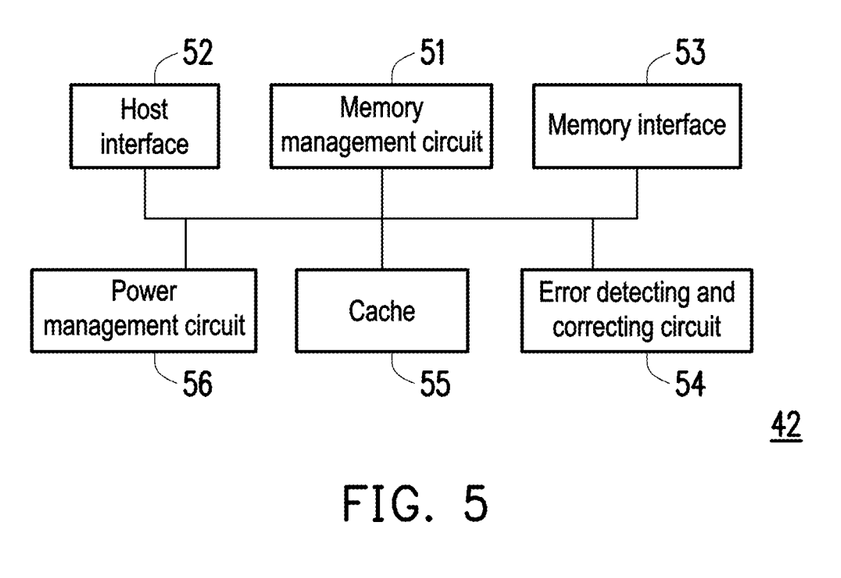
FIG. 5 is a schematic diagram of a memory control circuit unit according to an exemplary embodiment of the disclosure.

FIG. 5 is a schematic diagram of a memory control circuit unit according to an exemplary embodiment of the disclosure. Please refer to FIG. 5. The memory control circuit unit 42 includes a memory management circuit 51, a host interface 52, and a memory interface 53.

The memory management circuit 51 is used to control the overall operation of the memory control circuit unit 42. Specifically, the memory management circuit 51 has multiple control commands, and when the memory storage device 10 is operating, the control commands are executed to perform operations such as data writing, reading, and erasing. The following description of the operation of the memory management circuit 51 is equivalent to the description of the operation of the memory control circuit unit 42.

In an exemplary embodiment, the control commands of the memory management circuit 51 are implemented in the form of firmware. For example, the memory management circuit 51 has a microprocessor unit (not shown) and a read only memory (not shown), and the control commands are burnt into the read only memory. When the memory storage device 10 is operating, the control commands are executed by the microprocessor unit to perform operations such as data writing, reading, and erasing.

In an exemplary embodiment, the control commands of the memory management circuit 51 may also be stored to a specific area (for example, a system area dedicated to storing system data in a memory module) of the rewritable non-volatile memory module 43 in the form of program codes. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first executes the boot code to load the control commands stored in the rewritable non-volatile memory module 43 to the random access memory of the memory management circuit 51. After that, the microprocessor unit runs the control commands to perform operations such as data writing, reading, and erasing.

In an exemplary embodiment, the control commands of the memory management circuit 51 may also be implemented in the form of hardware. For example, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is used to manage a memory cell or a memory cell group of the rewritable non-volatile memory module 43. The memory write circuit is used to issue a write command sequence to the rewritable non-volatile memory module 43 to write data into the rewritable non-volatile memory module 43. The memory read circuit is used to issue a read command sequence to the rewritable non-volatile memory module 43 to read data from the rewritable non-volatile memory module 43. The memory erase circuit is used to issue an erase command sequence to the rewritable non-volatile memory module 43 to erase data from the rewritable non-volatile memory module 43. The data processing circuit is used to process data to be written into the rewritable non-volatile memory module 43 and data read from the rewritable non-volatile memory module 43. The write command sequence, the read command sequence, and the erase command sequence may each include one or more program codes or command codes and are used to instruct the rewritable non-volatile memory module 43 to execute corresponding operations such as writing, reading, and erasing. In an exemplary embodiment, the memory management circuit 51 may also issue other types of command sequences to the rewritable non-volatile memory module 43 to instruct to execute corresponding operations.

The host interface 52 is coupled to the memory management circuit 51. The memory management circuit 51 may communicate with the host system 11 through the host interface 52. The host interface 52 may be used to receive and identify commands and data sent by the host system 11. For example, the commands and the data sent by the host system 11 may be sent to the memory management circuit 51 through the host interface 52. In addition, the memory management circuit 51 may send data to the host system 11 through the host interface 52. In the exemplary embodiment, the host interface 52 is compatible with the PCI express standard. However, it must be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is used to access the rewritable non-volatile memory module 43. For example, the memory management circuit 51 may access the rewritable non-volatile memory module 43 through the memory interface 53. In other words, the data to be written into the rewritable non-volatile memory module 43 is converted into a format acceptable by the rewritable non-volatile memory module 43 via the memory interface 53. Specifically, if the memory management circuit 51 intends to access the rewritable non-volatile memory module 43, the memory interface 53 will send the corresponding command sequence. For example, the command sequences may include the write command sequence instructing to write data, the read command sequence instructing to read data, the erase command sequence instructing to erase data, and corresponding command sequences instructing various memory operations (such as changing a read voltage level, executing a garbage collection operation, etc.). The command sequences are, for example, generated by the memory management circuit 51 and sent to the rewritable non-volatile memory module 43 through the memory interface 53. The command sequences may include one or more signals, or data on a bus. The signals or the data may include command codes or program codes. For example, the read command sequence includes information such as a read recognition code and memory address.

In an exemplary embodiment, the memory control circuit unit 42 further includes an error detecting and correcting circuit 54, a cache 55, and a power management circuit 56.

The error detecting and correcting circuit 54 is coupled to the memory management circuit 51 and is used to execute error detecting and correcting operations to ensure the correctness of the data. Specifically, when the memory management circuit 51 receives a write command from the host system 11, the error detecting and correcting circuit 54 generates a corresponding error correcting code (ECC) and/or error detecting code (EDC) for the data corresponding to the write command, and the memory management circuit 51 writes the data corresponding to the write command and the corresponding error correcting code and/or error detecting code into the rewritable non-volatile in memory module 43. After that, when the memory management circuit 51 reads the data from the rewritable non-volatile memory module 43, the error correcting code and/or the error detecting code corresponding to the data are simultaneously read, and the error detecting and correcting circuit 54 executes the error detecting and correcting operations on the read data according to the error correcting code and/or the error detecting code.

The cache 55 is coupled to the memory management circuit 51 and is used to temporarily store data. The power management circuit 56 is coupled to the memory management circuit 51 and is used to control the power of the memory storage device 10. In an exemplary embodiment, the cache 55 may be used to temporarily store the data written by the host system 11, and when the cache 55 is fully written, the memory management circuit 51 writes the data temporarily stored in the cache 55 into the rewritable non-volatile memory module 43 at one time.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

In order to cope with issues such as an abnormal/sudden power loss, a cross temperature, or a read disturb that often occur in the memory storage device 10. The memory management circuit 51 may create a physical block management table for managing multiple physical blocks stored in the rewritable non-volatile memory module 43.

When power is restored after an abnormal power loss, the memory management circuit 51 may select at least one physical block to be refreshed based on the physical block management table.

Specifically, the category of the physical block to be refreshed may, for example, be a data physical block for storing user data, a garbage collection physical block for storing garbage collection data, or a mapping physical block for storing mapping table data.

In the exemplary embodiment, multiple physical blocks of the rewritable non-volatile memory module 43 may be logically grouped into a system area for storing management information of the memory storage device 10 and a data area for storing user data from the host system 11. The data area may be further divided into a storage area and an idle area. The physical block in the storage area is regarded as a physical block stored with data, and the physical block in the idle area is used to replace the physical block in the storage area. In other words, when receiving a write command and data to be written from the host system 11, the memory management circuit 51 extracts the physical block from the idle area to write the data to replace the physical block in the storage area.

In the exemplary embodiment, the mapping physical block is associated with the system area, and the garbage collection physical block and the data physical block are associated with the data area. To further explain, the garbage collection physical block is a physical block for storing valid data under a garbage collection algorithm.

In the exemplary embodiment, the memory management circuit 51 may search a last write page of each physical block associated with the storage area to determine whether the physical block is a physical block to be refreshed.

In the exemplary embodiment, the memory management circuit 51 writes the user data temporarily stored in the cache 55 into the rewritable non-volatile memory module 43 at one time when the cache 55 is fully written. Therefore, the memory management circuit 51 only needs to write the data stored in the physical block to be refreshed into other physical blocks together when writing the user data into the cache 55. In other words, the memory management circuit 51 does not need to complete all refresh operations at one time like the conventional technology.

If the number of the at least one physical block to be refreshed is greater than 1, the memory management circuit 51 may determine a current state and a category of each physical block to be refreshed. The category of each physical block to be refreshed may, for example, be the data physical block, the garbage collection physical block, or the mapping physical block. In addition, the current state of each physical block to be refreshed may, for example, be a normal state or an urgent state. A determination basis for the current state of each physical block to be refreshed is as shown in Table 1. Please refer to Table 1.

TABLE 1

| | | Type | |
| --- | --- | --- | --- |
| State | Data physical block | Garbage collection (GC) physical block | Mapping physical block |
| Normal state | Total capacity of physical blocks to be refreshed <50% of capacity of rewritable non-volatile memory module | Remaining capacity of rewritable non-volatile memory module >20% | $X > 2 * Cnt$ and $Y > 2 * Cnt$ |
| Urgent state | Total capacity of physical blocks to be refreshed ≥50% of capacity of rewritable non-volatile memory module | Remaining capacity of rewritable non-volatile memory module ≤20% | $X \leq 2 * Cnt$ or $Y \leq 2* Cnt$ |

In Table 1, Cnt represents that Cnt IOs need to be written before the cache 55 is fully written; X represents that X IOs need to be written before an operation of refreshing a mapping table needs to be performed; and Y represents that Y IOs need to be written before a garbage collection operation needs to be performed. In the exemplary embodiment, 1 IO may, for example, be writing 4K data 1 time.

In Table 1, regarding the garbage collection physical block, the memory management circuit 51 may set a fixed value as a determination basis for executing the garbage collection operation. For example, when the remaining capacity of the rewritable non-volatile memory module 43 is less than or equal to 20%, the memory management circuit 51 needs to execute the garbage collection operation to prevent affecting the write speed of subsequent write data. Accordingly, in the exemplary embodiment, when the remaining capacity of the rewritable non-volatile memory module 43 is less than or equal to 20%, the current state of the garbage collection physical block is the urgent state. In addition, the fixed value may be designed according to actual requirements and is not limited by the disclosure.

Next, when executing a first write operation, the memory management circuit 51 may execute second write operations of all physical blocks to be refreshed together based on current states and categories of all the physical blocks to be refreshed. In the exemplary embodiment, the first write operation is, for example, writing the user data into the cache 55. The second write operation is, for example, writing the data stored in the physical block to be refreshed into other physical blocks.

Specifically, if the at least one physical block to be refreshed has different current states, the memory management circuit 51 may prioritize the execution of the second write operation of the physical block to be refreshed having the urgent state. In other words, the memory management circuit 51 may prioritize the execution of the second write operation of the physical block to be refreshed having the urgent state. Afterwards, the memory management circuit 51 then executes the second write operation of the physical block to be refreshed having the normal state. In addition, if all the physical blocks to be refreshed have the same current state (that is, all the physical blocks to be refreshed are all in the urgent state or are all in the normal state), the memory management circuit 51 may sequentially execute the second write operations corresponding to the mapping physical block, the garbage collection physical block, and the data physical block.

Figure 6:
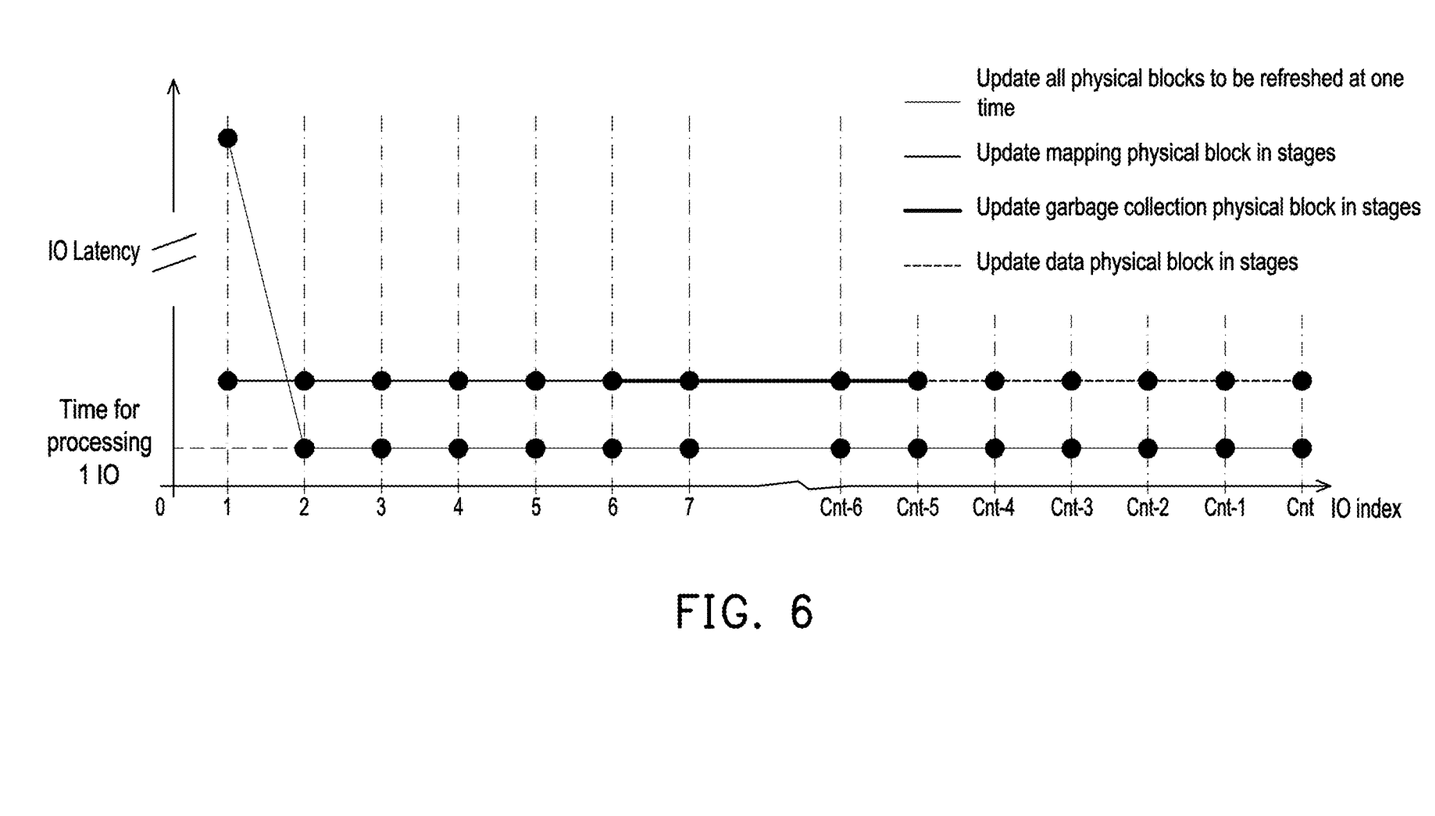
FIG. 6 is a diagram of a relationship between input output (IO) latency and write count (IO index) according to an exemplary embodiment of the disclosure.

According to the above, the memory management circuit 51 may execute the second write operations of all the physical blocks to be refreshed together when executing the first write operation. For example, please refer to FIG. 6. FIG. 6 is a diagram of a relationship between input output (IO) latency and write count (IO index) according to an exemplary embodiment of the disclosure. In the exemplary embodiment, the mapping physical block among the physical blocks to be refreshed is in the urgent state, and the data physical block and the garbage collection physical block are in the normal state. The memory management circuit 51 may sequentially execute the refresh operations on the mapping physical block, the garbage collection physical block, and the data physical block. As shown in FIG. 6, the memory management circuit 51 may evenly distribute the refresh operations of the physical blocks to be refreshed among multiple IOs written into the cache 55.

The calculation formula for the input output (IO) latency is as follows:

$$IO\ \text{Latency} = \text{Time for processing } 1\ IO + \text{Limit\_Time}$$

$$\text{Limit\_Time} = (3*\text{Time})/Cnt$$

In the above calculation formula, Limit_Time represents the time required to refresh all the physical blocks to be refreshed; Cnt represents that Cnt IOs need to be written before the cache 55 is fully written; and Time represents the time required to perform the refresh operation on a fully written physical block, wherein 3 represents that the memory management circuit 51 needs to execute the refresh operations on 3 physical blocks to be refreshed (that is, the mapping physical block, the garbage collection physical block, and the data physical block).

Accordingly, compared with the conventional technology, which is the method of refreshing all the physical blocks to be refreshed at one time (that is, when the write count (the IO index) is 1, the refresh operations of all the physical blocks to be refreshed are completed), the memory management circuit 51 of the disclosure may execute the second write operation together when executing the first write operation to evenly distribute the refresh operations of all the physical blocks to be refreshed. In other words, the memory management circuit 51 of the disclosure may sequentially refresh the mapping physical block, the garbage collection physical block, and the data physical block in stages, so that the input output (IO) latency may be evenly distributed to improve the quality of experience of a user.

Figure 7:
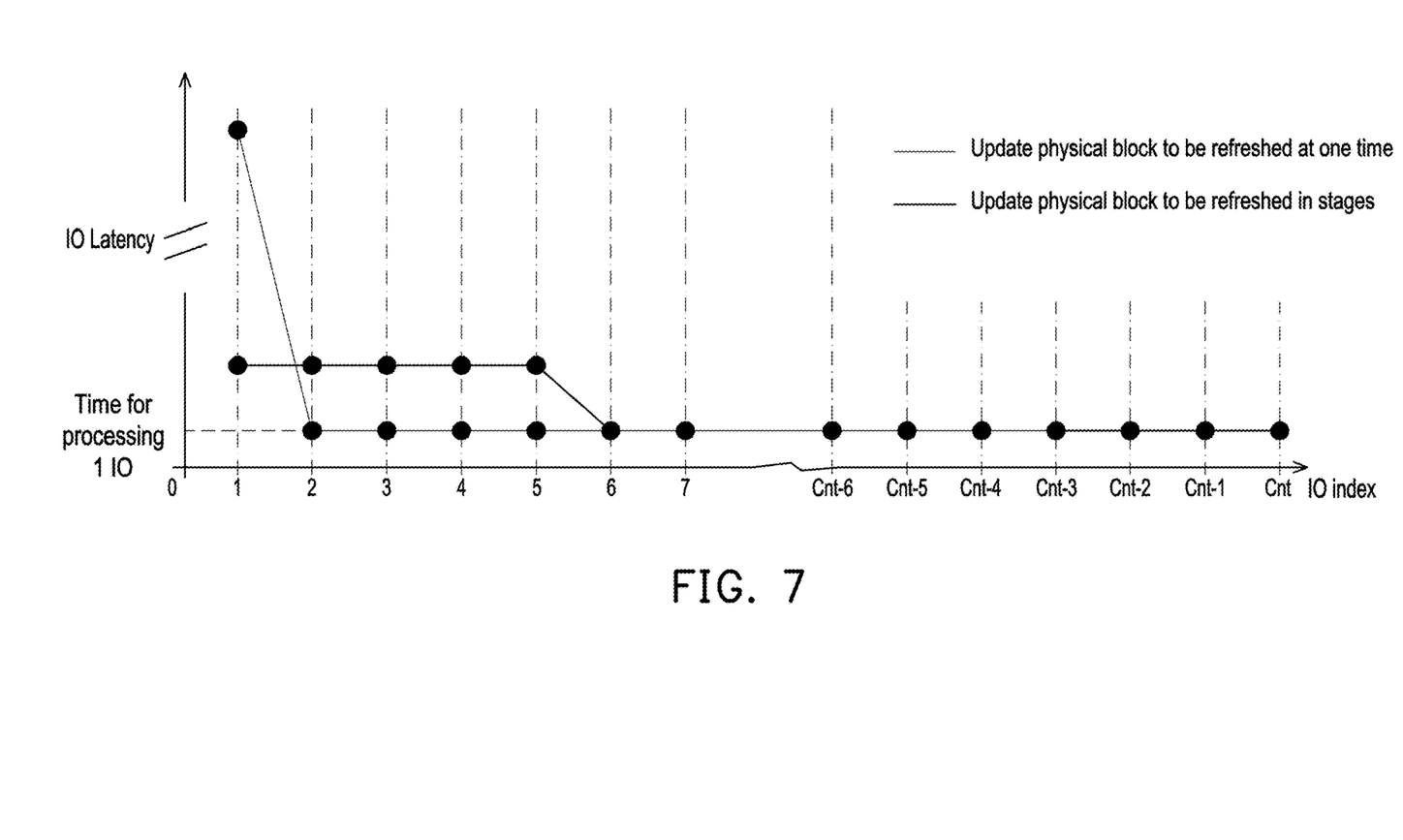
FIG. 7 is a diagram of a relationship between input output (IO) latency and write count (IO index) according to an exemplary embodiment of the disclosure.

On the other hand, if the number of the at least one physical block to be refreshed is equal to 1, the memory management circuit 51 may execute the second write operation together when executing the first write operation. For example, please refer to FIG. 7. FIG. 7 is a diagram of a relationship between input output (IO) latency and write count (IO index) according to an exemplary embodiment of the disclosure. In the exemplary embodiment, the memory management circuit 51 may execute the second write operation in stages. As shown in FIG. 7, when the write count (the IO index) is 5, the memory management circuit 51 completes the second write operation on the physical block to be refreshed. Accordingly, compared with the conventional technology, which is the manner of refreshing the physical block to be refreshed at one time, the memory management circuit 51 of the disclosure may simultaneously execute the refresh operation (the second write operation) on the physical block to be refreshed when executing the write operation (the first write operation) of the user data, so that the input output (IO) latency may be evenly distributed to improve the quality of experience of a user.

Figure 8:
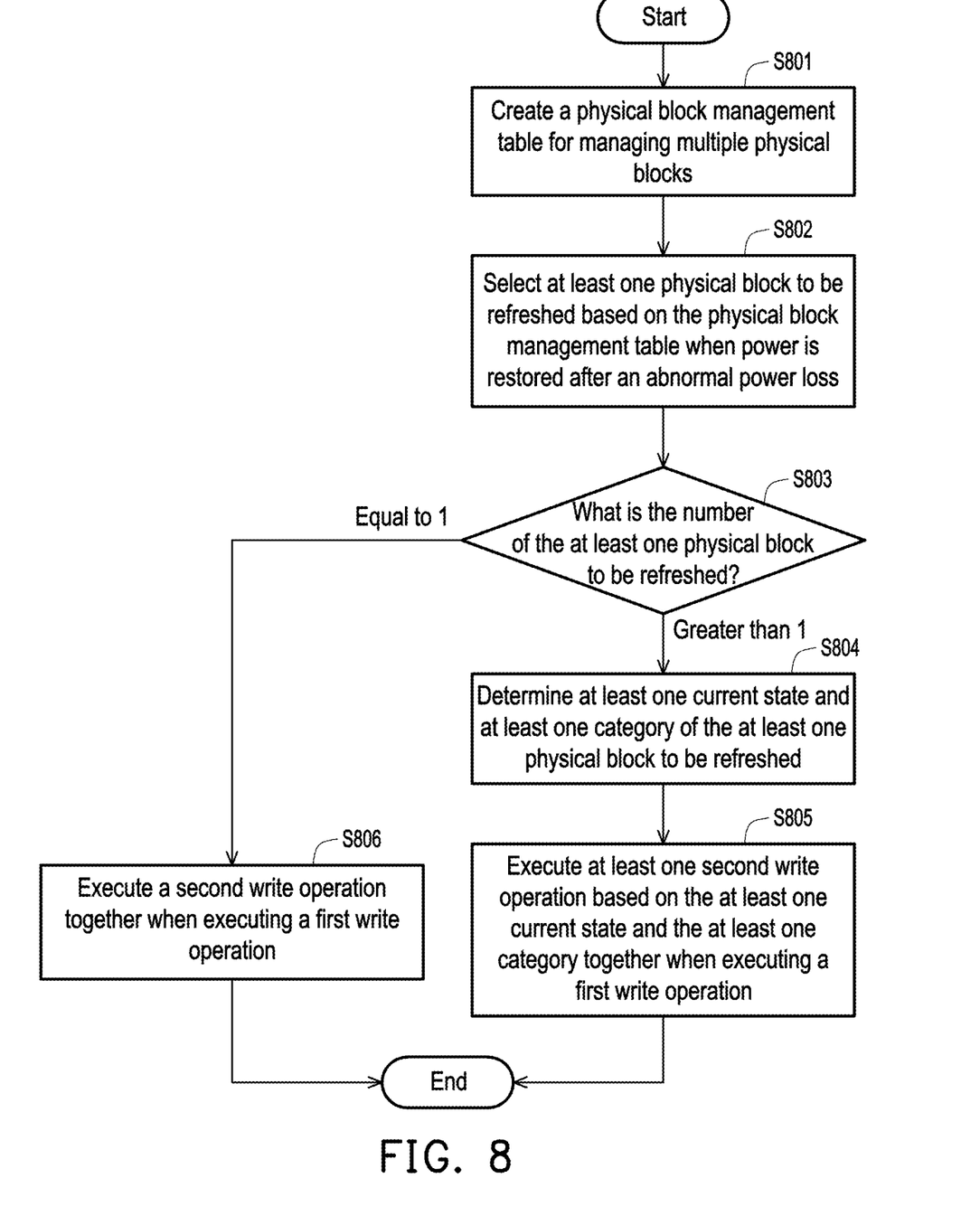
FIG. 8 is a flowchart of a memory management method according to an exemplary embodiment of the disclosure.

FIG. 8 is a flowchart of a memory management method according to an exemplary embodiment of the disclosure.

Please refer to FIG. 8. In Step S801, a physical block management table for managing multiple physical blocks is created. In Step S802, at least one physical block to be refreshed is selected based on the physical block management table when power is restored after an abnormal power loss. In Step S803, the number of the at least one physical block to be refreshed is determined. If the number of the at least one physical block to be refreshed is equal to 1, Step S806 is entered. However, if the number of the at least one physical block to be refreshed is greater than 1, Step S804 is entered.

In Step S804, at least one current state and at least one category of the at least one physical block to be refreshed are determined. Accordingly, in Step S805, at least one second write operation is executed based on the at least one current state and the at least one category together when executing a first write operation.

On the other hand, in Step S806, a second write operation is executed together when executing a first write operation.

The implementation details of Steps S801 to S806 have been described in detail in the foregoing exemplary embodiments and will not be repeated here. It is worth noting that each step in FIG. 8 may be implemented by multiple program codes or circuits and is not limited by the disclosure. In addition, the method of FIG. 8 may be used in conjunction with the foregoing exemplary embodiments or may be used alone and is not limited by the disclosure.

In summary, in the memory management method, the memory storage device, and the memory control circuit unit of the disclosure, the refresh operation of the physical block to be refreshed may be completed in stages before the cache is fully written, so that the input output (IO) latency can be evenly distributed to improve the quality of experience of the user.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A memory management method for a memory storage device, wherein the memory storage device comprises a rewritable non-volatile memory module and a cache, and the rewritable non-volatile memory module stores a plurality of physical blocks, the memory management method comprising:
    creating a physical block management table for managing the physical blocks;
    selecting at least one physical block to be refreshed based on the physical block management table when power is restored after an abnormal power loss;
    in response to a number of the at least one physical block to be refreshed being greater than 1, determining at least one current state and at least one category of the at least one physical block to be refreshed; and
    executing at least one second write operation based on the at least one current state and the at least one category together when executing a first write operation, wherein the first write operation comprises writing user data into the cache, and each of the at least one second write operation comprises writing data stored in a physical block to be refreshed into a first physical block,
    wherein each of the at least one current state is one of an urgent state and a normal state,
    wherein each of the at least one category is one of a data physical block for storing the user data, a garbage collection physical block for storing garbage collection data, and a mapping physical block for storing mapping table data,
    wherein the step of executing the at least one second write operation based on the at least one current state and the at least one category comprises:
        in response to current states of the at least one physical block to be refreshed being the same, executing the at least one second operation according to the at least one category to sequentially execute a second write operation of a physical block to be refreshed belonging to the mapping physical block, a second write operation of a physical block to be refreshed belonging to the garbage collection physical block and a second write operation of a physical block to be refreshed belonging to the data physical block.

2. The memory management method according to claim 1, further comprising:
    in response to the number of the at least one physical block to be refreshed being equal to 1, executing the second write operation together when executing the first write operation.

3. The memory management method according to claim 1, wherein the step of executing the at least one second write operation based on the at least one current state and the at least one category comprises:
    in response to current states of the at least one physical block to be refreshed being different, prioritizing execution of a second write operation of a physical block to be refreshed having the urgent state.

4. A memory storage device, comprising:
    a connection interface unit, used to couple to a host system;
    a rewritable non-volatile memory module, used to store a plurality of physical blocks; and
    a memory control circuit unit, coupled to the connection interface unit and the rewritable non-volatile memory module, comprising a cache, wherein
    the memory control circuit unit is used to create a physical block management table for managing the physical blocks,
    the memory control circuit unit is further used to select at least one physical block to be refreshed based on the physical block management table when power is restored after an abnormal power loss,
    in response to a number of the at least one physical block to be refreshed being greater than 1, the memory control circuit unit is further used to determine at least one current state and at least one category of the at least one physical block to be refreshed, and
    the memory control circuit unit is further used to execute at least one second write operation based on the at least one current state and the at least one category together when executing a first write operation, wherein the first write operation comprises writing user data into the cache, and each of the at least one second write operation comprises writing data stored in a physical block to be refreshed into a first physical block,
    wherein each of the at least one current state is one of an urgent state and a normal state,
    wherein each of the at least one category is one of a data physical block for storing the user data, a garbage collection physical block for storing garbage collection data, and a mapping physical block for storing mapping table data,
    wherein in response to current states of the at least one physical block to be refreshed being the same, the memory control circuit unit is further used to execute the at least one second operation according to the at least one category to sequentially execute a second write operation of a physical block to be refreshed belonging to the mapping physical block, a second write operation of a physical block to be refreshed belonging to the garbage collection physical block and a second write operation of a physical block to be refreshed belonging to the data physical block.

5. The memory storage device according to claim 4, wherein in response to the number of the at least one physical block to be refreshed being equal to 1, the memory control circuit unit is further used to execute the second write operation together when executing the first write operation.

6. The memory storage device according to claim 4, wherein in response to current states of the at least one physical block to be refreshed being different, the memory control circuit unit is further used to prioritize execution of a second write operation of a physical block to be refreshed having the urgent state.

7. A memory control circuit unit, disposed in a memory storage device and used to control a rewritable non-volatile memory module, wherein the rewritable non-volatile memory module stores a plurality of physical blocks, the memory control circuit unit comprising:
    a host interface, used to couple to a host system;

a memory interface, used to couple to the rewritable non-volatile memory module;

a cache, used to couple the host interface and the memory interface; and a memory management circuit, coupled to the host interface, the memory interface, and the cache, wherein the memory management circuit is used to create a physical block management table for managing the physical blocks, the memory management circuit is further used to select at least one physical block to be refreshed based on the physical block management table when power is restored after an abnormal power loss, in response to a number of the at least one physical block to be refreshed being greater than 1, the memory management circuit is further used to determine at least one current state and at least one category of the at least one physical block to be refreshed, and the memory management circuit is further used to execute at least one second write operation based on the at least one current state and the at least one category together when executing a first write operation, wherein the first write operation comprises writing user data into the cache, and each of the at least one second write operation comprises writing data stored in a physical block to be refreshed into a first physical block, wherein each of the at least one current state is one of an urgent state and a normal state, wherein each of the at least one category is one of a data physical block for storing the user data, a garbage collection physical block for storing garbage collection data, and a mapping physical block for storing mapping table data, wherein in response to current states of the at least one physical block to be refreshed being the same, the memory management circuit is further used to execute the at least one second operation according to the at least one category to sequentially execute a second write operation of a physical block to be refreshed belonging to the mapping physical block, a second write operation of a physical block to be refreshed belonging to the garbage collection physical block and a second write operation of a physical block to be refreshed belonging to the data physical block.

8. The memory control circuit unit according to claim 7, wherein in response to the number of the at least one physical block to be refreshed being equal to 1, the memory management circuit is further used to execute the second write operation together when executing the first write operation.

9. The memory control circuit unit according to claim 7, wherein in response to current states of the at least one physical block to be refreshed being different, the memory management circuit is further used to prioritize execution of a second write operation of a physical block to be refreshed having the urgent state.

* * * * *